C. T. POWERS.
BOBBIN-WINDERS FOR SEWING-MACHINES.

No. 188,943. Patented March 27, 1877.

Witnesses:
Peter J. Lusley
James Wood

Inventor:
Charles Thomas Powers

UNITED STATES PATENT OFFICE.

CHARLES T. POWERS, OF SHEFFIELD, ASSIGNOR TO WILLIAM JONES, OF GUIDE BRIDGE, NEAR MANCHESTER, COUNTY OF LANCASTER, ENGLAND.

IMPROVEMENT IN BOBBIN-WINDERS FOR SEWING-MACHINES.

Specification forming part of Letters Patent No. 188,943, dated March 27, 1877; application filed November 28, 1876.

*To all whom it may concern:*

Be it known that I, CHARLES THOMAS POWERS, of Sheffield, in the county of York, in the United Kingdom of Great Britain and Ireland, have invented an Improvement in Bobbin-Winders for Sewing-Machines, of which the following is a specification:

The object of my invention is to combine a spring presser-plate and guide-rod with a bobbin-winder in as compact a manner as possible, and so as to permit ready access to the bobbin. This object I attain by the construction hereafter described, reference being had to the accompanying drawing, in which—

Figure 1:
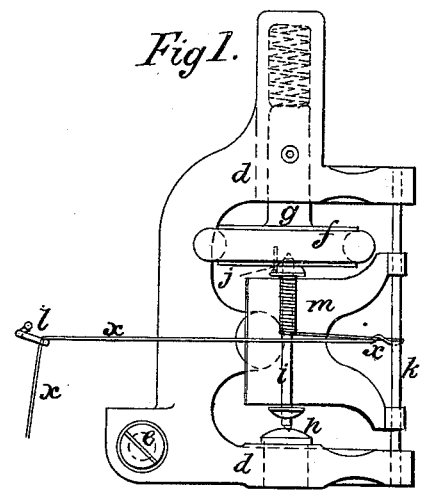
Figure 2:
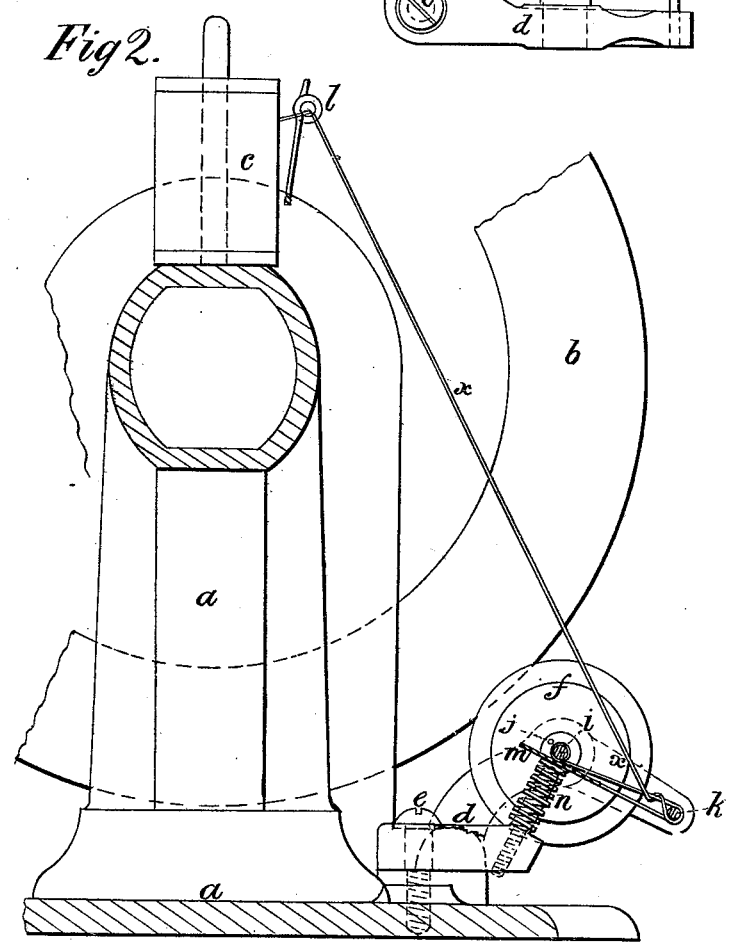

Figure 1 is a plan view of the bobbin-winding device, and Fig. 2 a vertical section of the winder applied to a sewing-machine.

Referring to Fig. 2, $a$ represents a portion of the frame of a sewing-machine; $b$, a portion of the fly-wheel, and $c$ the spool of thread from which the bobbin or reel for the shuttle is supplied. To the bed of the machine is secured the bracket $d$ by means of the screw $e$, so that the bracket may be adjusted to different positions. In the opposite arms of the bracket are the bearing $h$ and wheel $g$, between which the reel $i$ is held, in the usual manner, the rubber tire $f$ on the wheel $g$ being brought in contact with the fly-wheel of the sewing-machine when it is desired to wind the thread on the reel $i$. To the outer end of the arms carrying the bearing $h$ and wheel $g$ is adapted the rod $k$, over which the thread from the spool is passed to the reel, and to this rod is hung a presser-plate, $m$, which is maintained in contact with the inner surface of the reel by a spring, $n$, as shown in Fig. 2.

When it is desired to fill an empty bobbin with thread, the bobbin is placed in the bearings, as shown in Fig. 1, and the thread from the spool $c$ passes through the eye $l$ round the guide-bar $k$, and round itself, as shown, and thence to the spool $i$, the presser-plate $m$ laying the thread in even layers, while the wrapping of the thread round itself gives it an even tension.

It will be seen that the above arrangement of spring presser-plate and guide is compact, while it also permits easy access to the spool.

The hinging of the presser-plate to the guide-rod has also this advantage, that the said presser-plate, being at about the same tangent to the reel as is the line of thread, will always press on the said thread at the point where the latter first comes in contact with the reel, and thus prevent any lapping of the thread.

I wish it to be understood that I do not desire to claim, broadly, either the presser-plate or the guide-rod, as these are shown in the patent of F. H. Drake, August 16, 1864; but

I claim as my invention—

The combination of the bracket $d$ and bobbin or reel $i$ with the guide-bar $k$ and the spring presser-plate $m$, hinged to the said bar, substantially as described.

CHARLES THOMAS POWERS.

Witnesses:
 PETER J. LIVSEY,
 JAMES WOOD.